Sept. 30, 1952 W. C. GRANNIS 2,611,926
APPARATUS FOR VULCANIZING FROTHED LATEX RUBBER
Filed Jan. 5, 1951 2 SHEETS—SHEET 1
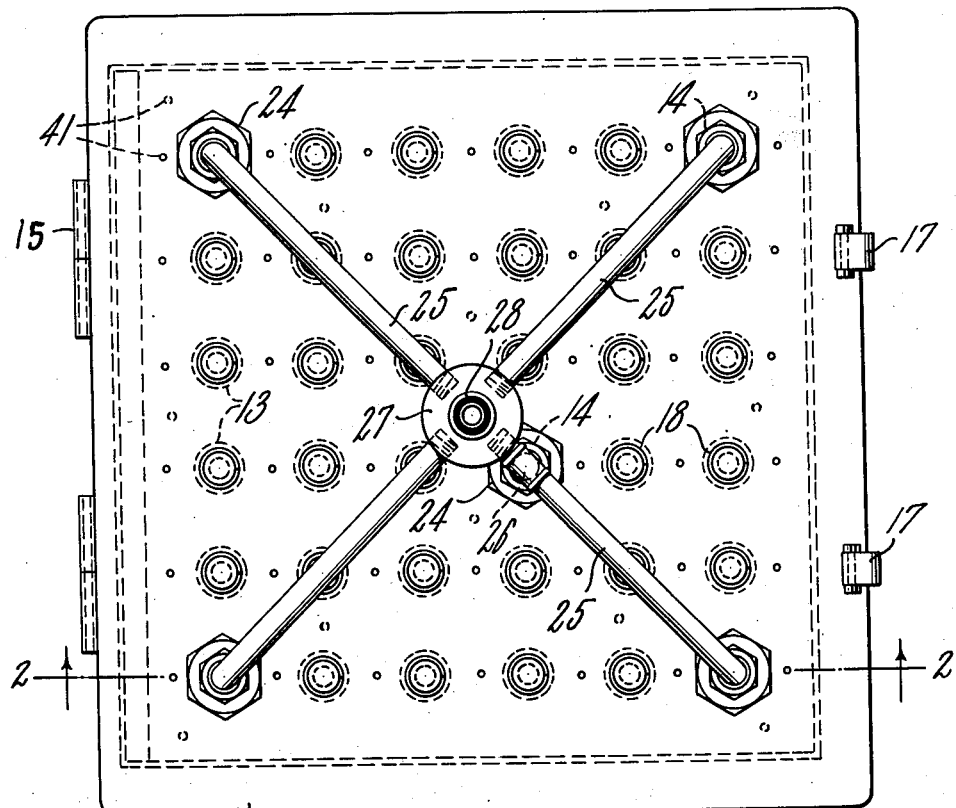
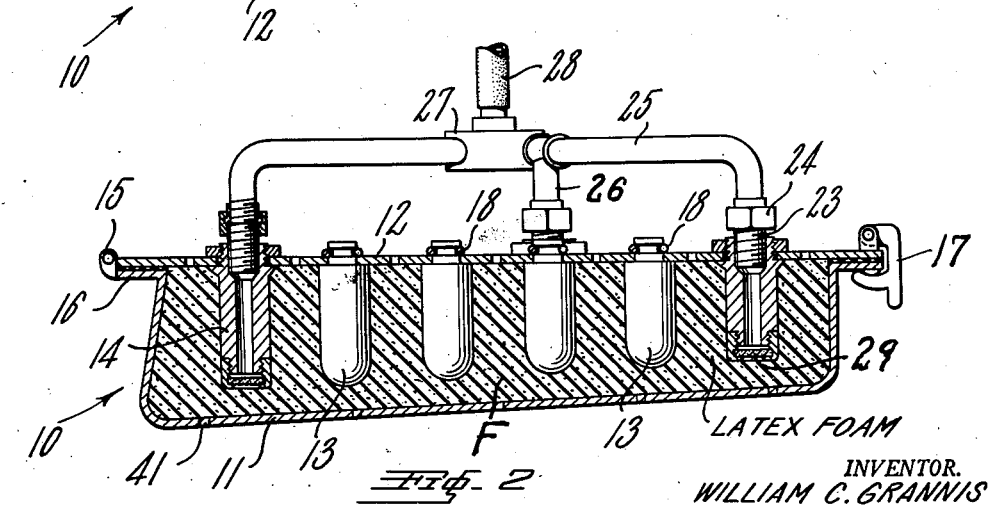
LATEX FOAM
INVENTOR.
WILLIAM C. GRANNIS
BY
Charles C. Willson
ATTORNEY

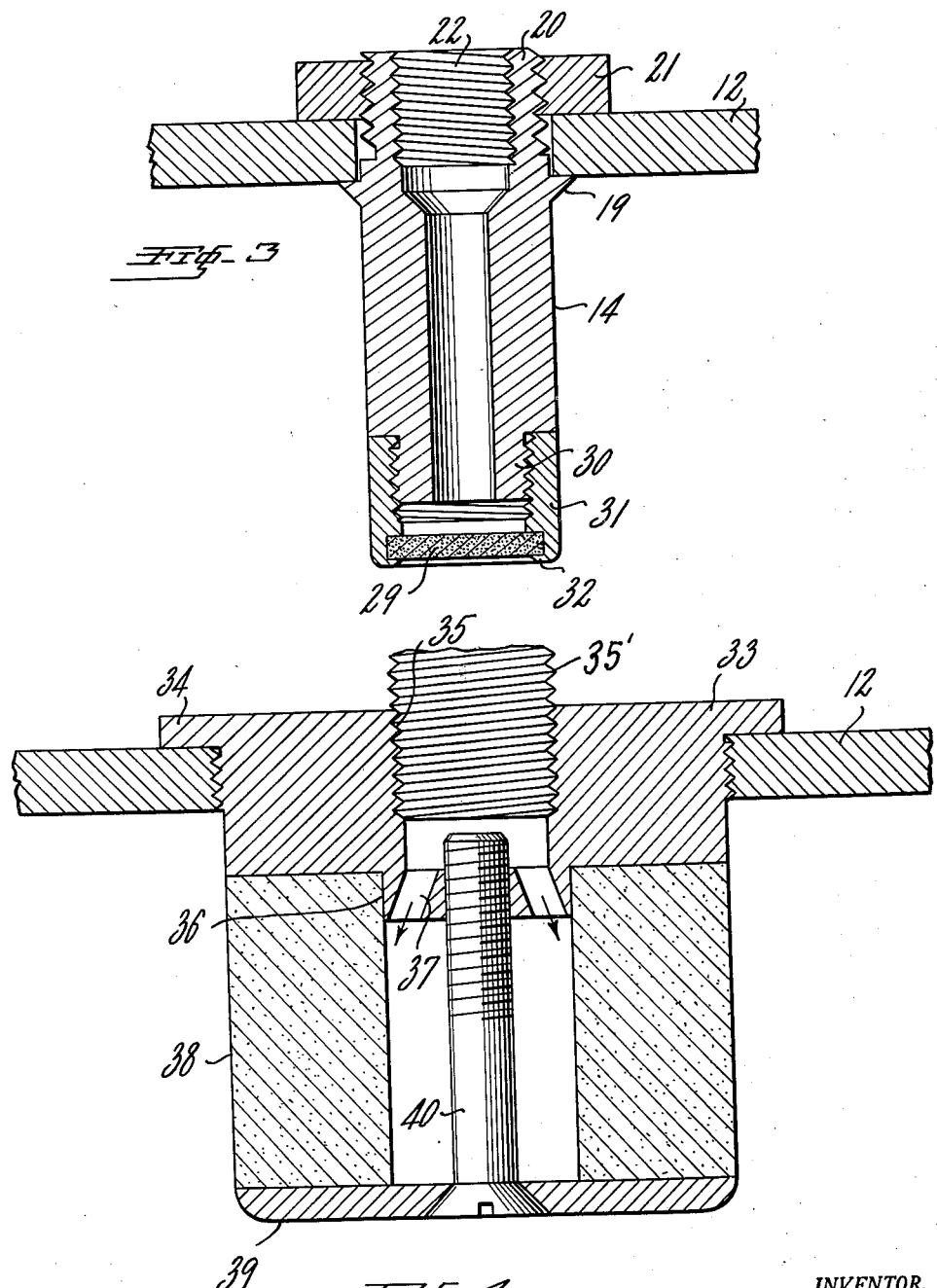

Patented Sept. 30, 1952

2,611,926

UNITED STATES PATENT OFFICE 2,611,926

APPARATUS FOR VULCANIZING FROTHED LATEX RUBBER

William C. Grannis, South Bend, Ind., assignor to United States Rubber Company, New York, N. Y., a corporation of New Jersey Application January 5, 1951, Serial No. 204,579

3 Claims. (Cl. 18—38)

This invention relates to novel apparatus for vulcanizing sponge rubber having interconnected cells, and particularly an open cell sponge rubber made from frothed natural or synthetic latex.

Sponge or foam rubber, as is well known, is made by compounding natural or synthetic rubber latex with certain ingredients, such as vulcanizing agents, accelerators, gelling agents and stabilizers, and then whipping the latex into a foam or froth, which is deposited into a mold and allowed to gel by permitting it to rest at room temperature or slightly higher temperature. It is then vulcanized by the application of heat to form a molded sponge rubber article.

If this vulcanizing step is carried out, as is usual, by placing the mold containing the gelled latex froth in a hot vulcanizing chamber, the time required for vulcanizing the sponge rubber mass will vary from about 20 to 60 minutes, depending upon the size of the molded article particularly its thickness. A large portion of this time is required for the heat to penetrate into the central portion of the sponge mass, before such central portion begins to cure.

The primary object of the present invention is to provide novel apparatus adapted to be used to cure open-cell sponge rubber quickly, such as foamed or frothed latex, by introducing live steam into the interior of the molded cellular mass so that this steam will travel through the various cells and quickly heat and cure the entire molded mass. The idea of quickly vulcanizing a molded mass of frothed latex by passing steam through the cellular mass is described and claimed in the Lovell application, Serial No. 103,545, filed July 8, 1949, wherein it is proposed to make some of the cores that project into the interior of the mold hollow so that steam may be introduced into these hollow cores and discharge therefrom through small apertures into the foamed mass to cure the same.

While this Lovell application discloses a good method for quickly curing the molded foam mass, it is found that the apertures formed in the hollow cores through which steam is discharged into the foamed mass are likely to become clogged by the frothed latex entering these apertures and being cured therein. This is highly objectionable since it necessitates the clearing of these apertures from time to time so that the steam may pass therethrough, and the cleaning of these apertures in the various cores is time-consuming and adds to the cost of manufacturing the molded sponge rubber articles.

In accordance with the present invention the steam used to quickly cure the sponge rubber mass is introduced into the same from hollow cores projecting into the frothed mass, but these cores are so constructed that the steam discharging apertures do not become clogged with latex as heretofore. The clogging of the steam outlet pores with the foamed latex is prevented by providing each hollow core used to discharge steam into the foamed mass with a microporous filter portion that contacts the froth. This filter portion is formed of microporous material that will permit the steam to escape from the interior of the hollow core into the foamed mass but will prevent the foamed mass from entering these pores and clogging them. This desired result is secured by using in the filter portion of the cores a microporous material that has a one-way action in that it permits the steam to escape from the interior of the hollow core into the set mass but prevents the frothed latex from entering these pores.

The filter portions of the hollow cores may be formed of various microporous materials, such as a thin sheet of porous stainless steel which is made by the micro metallic process developed by Micro Metallic Corporation of Brooklyn, N. Y. In this sheet the raw material is stainless steel powder of uniform particle size, laid out in the form of a sheet, and heat treated to form a strong, ductile, highly porous sheet material of uniform pore size. This material is now on the market in a number of pore sizes. In carrying out the present invention, it is preferred to employ a thin sheet that need be only a few hundredths of an inch thick and having a mean pore opening of not less than 20 microns and not more than 80 microns, since if the pores are smaller than 20 microns in size it is difficult to force the steam therethrough, and if they are larger than 80 microns the frothed latex tends to enter and clog these pores.

These hollow cores, as in said application, extend into the mold and form spaced molded holes in one or both faces of the finished molded sponge rubber article. The cores used heretofore are more or less standard in size, the smaller cores being ¾ of an inch in diameter and the larger cores being 2 inches in diameter. The same sizes can be used in carrying out the present invention. In the small cores that are ¾ of an inch in diameter, it is desirable to use a porous stainless steel filter made from the sheet material above described. For the larger cores having a diameter of 2 inches it is desirable to use filters made of porous carbon, preferably in the form of thick walled cylinder tubes that form the major portion of such hollow cores. These carbon filters are less expensive than the stainless steel filters, and they offer the further advantage of introducing the steam in the latex mass throughout a larger portion of the core. These porous tubes can be made from finely divided carbon particles or graphite particles secured together by a suitable binder that will not be affected by steam. Porous carbon tubes are readily available on the market where they are sold for use as filters. These carbon tubes may be cut into short tube lengths for use as contemplated by the present invention. It is important however that the pores, as above described, be small enough to prevent the frothed latex from entering and clogging the same while they are large enough to allow the steam to pass therethrough.

It is found that any tendency of the latex froth to cling to the porous carbon surface can be greatly reduced by applying to the outer surface of said carbon tubes a phenol-formaldehyde resinous material, and by blowing air through the pores before such resinous material has set, to thereby form a smooth resinous outer surface on the tubes without closing the pores of the same. It is possible however to use other porous material as a part of the core such as ceramics and sintered glass filters, but they are not very satisfactory because they are fragile and may break while in use, and cause broken portions thereof to lodge in the molded sponge rubber article.

The above and other features of the present invention will be further understood from the following description when read in connection with the accompanying drawings showing two forms of apparatus for carrying out the invention.

In the drawings:

Fig. 1 is a top plan view of a mold constructed in accordance with the present invention for vulcanizing frothed latex rubber;

Fig. 2 is a sectional view taken on the line 2—2 of Fig. 1;

Fig. 3 is an enlarged sectional view of one of the hollow cores shown in Fig. 2; and Fig. 4 is a vertical sectional view through a modification showing a different type of hollow core provided with a tubular filter portion for supplying steam to the foamed latex mass.

The apparatus contemplated by the present invention for quickly vulcanizing a molded mass of frothed latex by forcing curing steam through the cells of the mass, may be employed in connection with various types of molds, provided the mold has cores projecting inwardly from one or more faces thereof so that they extend well into the mass of frothed latex filling the mold. The mold used in carrying out the present invention may be provided with a number of solid cores such as used heretofore, but it should also be provided with a smaller number of hollow stem cores which are carefully placed so as to cause the frothed latex mass to cure substantially uniformly throughout its entire area.

Now referring to the drawing and more particularly to Figs. 1, 2 and 3, the mold 10 is for the most part, of the conventional type used for molding sponge rubber cushions having core holes extending deep into the same from one face thereof. This mold consists of the bottom pan 11, and top plate 12 from which core elements 13, of usual construction, project into the mold. In addition to the cores 13 which may be made of solid metal such as aluminum, there are also provided in accordance with the present invention, the hollow cores 14 of special construction to be described. These cores 14 may also be formed of aluminum. In the mold shown the top plate 12 is secured by hinges 15 to an outwardly extending flange portion 16 of the pan 11. When the mold is closed as shown in Figs. 1 and 2 it may be locked in the closed position by the latches 17 that are secured to the top plate and engage the under portion of the flange 16 as shown in Fig. 2. The solid cores 13 of usual construction are conveniently secured to the top plate 12 by providing each core with a reduced neck as shown and adapted to extend upwardly through a hole in such plate, and each core may be secured to the plate by means of a split ring 18 which can be sprung into place so that it lies in a groove formed around the neck of the core and engages the upper face of the top plate to lock the core in place.

The hollow cores 14 which serve to supply the curing steam to the interior of the molded mass and which are constructed in accordance with the present invention, are shown in Figs. 1 and 2 as disposed, one adjacent each of the four corners of the mold and one in the center portion of the mold. Each of these hollow cores 14 may be constructed as best shown in Fig. 3 wherein it will be seen that the core has an annular flange or shoulder 19 adapted to engage the lower face of the top plate 12 and it also has an internally and externally threaded neck 20. The outer threaded portion of this neck is provided with a clamping nut 21 which rests against the upper face of the top plate 12. The inner threaded portion 22 of this neck is adapted to receive a threaded nipple 23 which is secured by a nut 24 to a steam supply pipe 25 as shown in Fig. 2. The four corner cores 14 are supplied with steam by pipes 25, and a central core 14 is supplied with steam by the pipe 26. Steam is supplied to these pipes by the header 27 having the steam supply pipe 28 leading thereto.

In using the mold just described for molding and vulcanizing a mass of latex foam or froth, the mold is filled with the frothed latex nearly to the top of the pan 11 so that when the top plate 12 is moved to its closed position and the cores 13 and 14 are forced into the soft froth, this froth which is indicated by F will completely fill the mold as shown in Fig. 2. Then as soon as this froth has gelled or set its cells will communicate so that if steam is now supplied to the cores 14 it will pass into the froth, in a manner now to be described and quickly vulcanizes the molded mass.

The primary feature of the present invention, as above stated, resides in the construction whereby each hollow core 14 used to supply steam to the interior of the foamed mass is provided with a microporous filter portion that contacts the froth. This filter is provided in accordance with the disclosure of Figs. 1, 2 and 3 by securing to the lower end of such hollow core 14 a filter disk 29 formed of porous stainless steel as above described. Various means may be employed for securing this filter disk to the core 14. In the construction shown this is accomplished by threading the lower end of the core 14 as indicated by 30 and securing to this threaded portion a cap 31 preferably formed of stainless steel. This cap is provided with an annular recess adapted to receive the filter disk 29 which may be firmly secured to the cap by spinning a portion of the end of the cap over the disk as indicated at 32. It is desirable to removably secure the filter disk 29 to the hollow core 14 so that it can be removed from time to time and cleaned by placing it in nitric acid, which will not injure either the stainless steel cap or the stainless steel filter. This occasional cleaning of the cap is needed primarily to clean dirt from the same that may be carried into the filter by the stream, and while the steam should be filtered and all reasonable care used to supply only clean steam to the cores 14, it may still be necessary to clean the disk 29 from time to time. If the hollow core 14 is relatively small, say only ¾ of an inch in diameter, then it may be desirable, as above stated, to use the stainless steel type of filter disk 29, notwithstanding the fact that this stainless steel material is expensive. If however, a larger core is used such as one having a two inch diameter, then it may be desirable to use a different type of filter such as shown in the modification of Fig. 4 and which will now be described.

The type of hollow core shown in Fig. 4 may be secured to a mold top plate such as is indicated by 12 in the drawings, and to this end it may be provided with an aluminum plug 33 secured in a threaded opening in the plate 12 as shown so that a flange 34 upon this plug will seat against the upper face of the plate 12 and the plug may extend inwardly a short distance from the inner face of such plate as shown. This plug has a threaded central opening 35 adapted to receive a threaded nipple such as 35' for supplying steam thereto. This plug 33 is shown as having extending downwardly therefrom the annular neck portion 36, which has formed therein the steam ports 37. The filter portion 38 of this hollow core is preferably formed of a thick tube of porous carbon material. This filter portion 38 can be readily cut from a long tube of the same material, which is now readily purchased on the market where it is sold for filter purposes. The filter tube 38 is centered with respect to the plug 33 by the neck 36 which fits within the central bore of the filter tube and the filter is firmly clamped in place by the metal disk 39 and screw 40 which is screwed into a threaded opening in the neck 36.

The curing steam supplied to the hollow core shown in Fig. 3 or in Fig. 4 at a pressure of several pounds should be clean, dry steam supplied under sufficient pressure to pass fairly rapidly through the pores into the latex foam to be released within the mold at a pressure that is only slightly above atmosphere. If the steam issues from the porous filters at a relatively high pressure it will force the cellular structure away from the cores and break down the gelled cellular structure before it is vulcanized.

The filter portion of the hollow cores may be formed of various microporous materials which are capable of withstanding the temperature and pressure of the steam used to effect the vulcanization. The size of the pores should be sufficient to permit the steam to pass fairly freely therethrough, while on the other hand they should be small enough to prevent the frothed latex from entering these pores and clog the filter. It is believed that the size of such pores should be at least 20 microns but not greater than 80 microns.

It is found in practice that by employing the construction herein described it is possible to secure as many as 1,000 cures from a mold without stopping to clean the porous filter portion of the cores, and that since the frothed mass when set or gelled has an open cellular structure, the steam supplied by the hollow cores can pass readily through the cellular structure in all directions to quickly vulcanize the same and then escape through small apertures 41 formed in different portions of the molding receptacle. This rapid passage of the dry steam through all portions of the molded frothed mass produces a rapid cure requiring only a few minutes, in contrast with the many minutes required to cure the same size molded mass when the old method of placing the filled mold in a vulcanizer is used.

Having thus described my invention, what I claim and desire to protect by Letters Patent is:

1. A vulcanizing mold for a mass of frothed latex, comprising a molding receptacle having hollow cores projecting into the mold from one surface thereof, means for supplying steam under pressure to said cores, each core having a fine porous filter portion that contacts the froth and through which steam can pass from the hollow core into the set latex forth to vulcanize the froth, and said filter portion being formed of microporous material through which the steam can escape but the frothed latex can not enter to clog its pores.

2. A vulcanizing mold for a mass of frothed latex, comprising a molding receptacle having hollow cores projecting into the mold from one surface thereof, means for supplying steam under pressure to said cores, each core having a fine porous filter portion that contacts the froth and through which steam can pass from the hollow core into the set latex froth to vulcanize the froth, and said filter portion being formed of a sheet of microporous stainless steel through which the steam can pass but the frothed latex can not enter to clog its pores.

3. A vulcanizing mold for a mass of frothed latex, comprising a molding receptacle having hollow cores projecting into the mold from one surface thereof, means for supplying steam under pressure to said cores, each core having a fine porous filter portion that contacts the froth and through which steam can pass from the hollow core into the set latex froth, and said filter portion being formed of molded carbon particles through which the steam can pass but the frothed latex can not enter to clog the pores.

WILLIAM C. GRANNIS.

REFERENCES CITED

The following references are of record in the file of this patent:

UNITED STATES PATENTS

| Number | Name | Date |
|---|---|---|
| 2,150,287 | Minor | Mar. 14, 1939 |
| 2,325,903 | Blair | Aug. 3, 1943 |
| 2,351,529 | Luxenberger | June 13, 1944 |